(12) United States Patent
Sato et al.

(10) Patent No.: US 7,263,384 B2
(45) Date of Patent: Aug. 28, 2007

(54) RADIO NETWORK CONTROLLER AND BROADCAST INFORMATION TRANSMISSION METHOD

(75) Inventors: Takaaki Sato, Kawasaki (JP); Kota Fujimura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 452 days.

(21) Appl. No.: 10/851,424

(22) Filed: May 21, 2004

(65) Prior Publication Data
US 2005/0043061 A1 Feb. 24, 2005

(30) Foreign Application Priority Data
May 21, 2003 (JP) ............................ P2003-143919

(51) Int. Cl.
*H04B 1/38* (2006.01)
*H04M 1/00* (2006.01)
(52) U.S. Cl. .................. 455/560; 455/432.1; 455/438; 455/435.1; 455/435.2
(58) Field of Classification Search ................ 455/560, 455/432.1, 552.1, 436, 438, 434, 435.1, 435.2; 370/498
See application file for complete search history.

(56) References Cited

U.S. PATENT DOCUMENTS

| 5,678,181 | A | * | 10/1997 | Kamachi | 455/63.1 |
| 6,256,509 | B1 | * | 7/2001 | Tanaka et al. | 455/515 |
| 6,298,239 | B1 | * | 10/2001 | Yonemoto et al. | 455/466 |
| 6,449,488 | B1 | * | 9/2002 | Cheng et al. | 455/466 |

(Continued)

FOREIGN PATENT DOCUMENTS

DE 199 35 438 A1 2/2001

(Continued)

OTHER PUBLICATIONS

3rd Generation Partnership Project; Technical Specification Group Radio Access Network; Radio Resource Control (RRC) Protocol Specification, *3GPP TS 25.331 v3.14.0*, 1999, 26 pages.

(Continued)

*Primary Examiner*—Edan Orgad
*Assistant Examiner*—Fayyaz Alam
(74) *Attorney, Agent, or Firm*—Brinks Hofer Gilson & Lione

(57) ABSTRACT

The object of the invention is to allow two systems residing in the same area and same frequency band to be coexistent compatibly with each other while reducing the mutual interference. A radio network controller 20 for controlling the broadcast timing when various kinds of broadcast information is broadcast with respect to each of two systems, which reside in the same frequency band of the same area and have common specification for physical layer in a state where all or a part of upper layer protocols have no compatibility, broadcasts various kinds of broadcast information about system 1 at a predetermined timing. With respect to various kinds of broadcast information about system 2, broadcast timing information, which is scheduled to be staggered from the broadcast timing of the system 1, is notified using a part of region of the broadcast information, and the broadcast information of the system 2 is broadcast at the notified broadcast timing.

18 Claims, 8 Drawing Sheets

U.S. PATENT DOCUMENTS

| | | | |
|---|---|---|---|
| 6,567,416 B1 * | 5/2003 | Chuah | 370/418 |
| 2004/0027999 A1 * | 2/2004 | Casaccia et al. | 370/312 |
| 2004/0202143 A1 * | 10/2004 | Diachina et al. | 370/347 |
| 2004/0203965 A1 * | 10/2004 | Robinson | 455/502 |
| 2005/0020299 A1 * | 1/2005 | Malone et al. | 455/552.1 |
| 2005/0096059 A1 * | 5/2005 | Jiang et al. | 455/450 |
| 2005/0261012 A1 * | 11/2005 | Weiser | 455/466 |
| 2006/0030312 A1 * | 2/2006 | Han et al. | 455/432.1 |
| 2006/0126590 A1 * | 6/2006 | Putcha et al. | 370/343 |

FOREIGN PATENT DOCUMENTS

| | | |
|---|---|---|
| EP | 0 928 119 A2 | 7/1999 |

OTHER PUBLICATIONS

European Search Report, EP Pat. App. No. 04011962.0, Dec. 5, 2006.

* cited by examiner

RADIO NETWORK CONTROLLER AND BROADCAST INFORMATION TRANSMISSION METHOD

BACKGROUND OF THE INVENTION

1. Field of the Invention

The present invention relates to a radio network controller for controlling the broadcast timing when various kinds of broadcast information is broadcast with respect to each of two mobile communication systems, which reside in the same frequency band of the same area and have common specification for physical layer in a state where all or a part of upper layer protocols have no compatibility, and relates to a broadcast information transmission method in the radio network controller.

2. Related Background Art

Conventionally, in a DS-CDMA mobile communication system, a switching center for connecting with other networks is connected to a plurality of radio network controllers, each radio network controller controls a plurality of base stations, and each base station administers a plurality of cells or a plurality of clusters. In each cell or each cluster, various kinds of information such as information, which is necessary for a mobile station within the area to camp on, and information, which is effective after connection, is broadcast periodically (refer to the document "3rd Generation Partnership Project; Technical Specification Group Radio Access Network; Radio Resource Control (RRC) protocol specification (Release 1999)"). The above-mentioned information is prepared in the radio network controller and transmitted to the mobile station via the base station.

FIG. 1 shows an example of broadcast information according to a conventional method. In each broadcast information, a region for notifying at what timing various kinds of information is broadcast, is fixedly set as shown with region A in FIG. 1, and the above timing information is notified using the fixed region A. The mobile station acquires the broadcast information in a cell or cluster that it is attempting to camp on, by acquiring the timing information given in region A. The information given in region A includes the exact timing when each kinds of broadcast information is sent (as shown by time pointer information indicated with the arrows in FIG. 1).

SUMMARY OF THE INVENTION

However, when a plurality of mobile communication systems reside in the same band of the same area, and when these systems have common specification for physical layer, but have little compatibility in upper layer, there is a possibility that these mobile communication systems interfere with each other until dedicated resources are allocated to the mobile stations, and the both can not be coexistent with each other depending on the type of other compatibility.

Also, even when the interference can be prevented before the dedicated resources are allocated to the mobile stations by some methods, since the broadcast information is transmitted in a manner of time division multiplex based on each mobile communication system, when the amount of information of the broadcast information is large, it may cause such problem as increase in connection delay resulting in a decreased efficiency of information transmission in the mobile communication system.

The present invention has been achieved to solve the above-described problems. An object of the present invention is to provide a radio network controller and a broadcast information transmission method, which are capable of allowing two mobile communication systems residing in the same area and same frequency band to be coexistent compatibly with each other while reducing the mutual interference.

In order to achieve the above-mentioned object, a radio network controller according to the present invention is a radio network controller for controlling the broadcast timing when various kinds of broadcast information is broadcast with respect to each of two mobile communication systems, which reside in the same frequency band of the same area and have common specification for physical layer in a state where all or a part of upper layer protocols have no compatibility, comprises a control unit that controls to broadcast various kinds of broadcast information about one mobile communication system at a predetermined timing; with respect to various kinds of broadcast information about the other mobile communication system, to notify broadcast timing information, which is scheduled to be staggered from the broadcast timing of the one mobile communication system, using a part of region of the broadcast information, and to broadcast the broadcast information of the other mobile communication system at the notified broadcast timing.

Also, a broadcast information transmission method according to the present invention is a broadcast information transmission method, in a radio network controller for controlling the broadcast timing when various kinds of broadcast information is broadcast with respect to each of two mobile communication systems, which reside in the same frequency band of the same area and have common specification for physical layer in a state where all or a part of upper layer protocols have no compatibility, comprises the steps of broadcasting various kinds of broadcast information about one mobile communication system at a predetermined timing; with respect to various kinds of broadcast information about the other mobile communication system, notifying broadcast timing information, which is scheduled to be staggered from the broadcast timing of the one mobile communication system, using a part of region of the broadcast information, broadcasting the broadcast information of the other mobile communication system at the notified broadcast timing.

According to the present invention, in a radio network controller for controlling the broadcast timing when various kinds of broadcast information is broadcast with respect to each of two mobile communication systems, which reside in the same frequency band of the same area and have common specification for physical layer in a state where all or a part of upper layer protocols have no compatibility; and various kinds of broadcast information about one mobile communication system is broadcast at a predetermined timing. With respect to various kinds of broadcast information about the other mobile communication system, broadcast timing information, which is scheduled to be staggered from the broadcast timing of the one mobile communication system, is notified using a part of region of the broadcast information, and the broadcast information of the other mobile communication system is broadcast at the notified broadcast timing.

As described above, by broadcasting broadcast information about one mobile communication system at a predetermined timing, it is easy to schedule the broadcast timing of the broadcast information about the other mobile communication system being staggered from the broadcast timing of the above one mobile communication system. Since the broadcast information of the other mobile communication system is broadcast at the notified broadcast timing, which is scheduled to be staggered therefrom, it is possible to suppress the mutual interference between two mobile communication systems. Further, what is notified using a part of region in the broadcast information is the broadcast timing information of the other mobile communication system only. Accordingly, even when the amount of information of the broadcast information is large, it is possible to prevent such problem as increase in connection delay, or the like; thus, it is possible to prevent the transmission efficiency of information in the mobile communication system from decreasing.

Therefore, according to the present invention, two mobile communication systems residing in the same area and same frequency band are allowed to be coexistent compatibly with each other while preventing the mutual interference.

The above-mentioned control unit is preferably arranged so as to perform both or either of dividing of broadcast information and alteration of the broadcast period of the broadcast information in accordance with the priority of the broadcast information. Likewise, the above-mentioned broadcast information transmission method also is preferably arranged so as to perform both or either of dividing of broadcast information and alteration of the broadcast period of the broadcast information in accordance with the priority of the broadcast information.

In these cases, the repetition period of the transmission can be controlled in accordance with the priority of the broadcast information as well as an appropriate broadcast information transmission control can be carried out in accordance with the priority of the broadcast information.

DESCRIPTION OF THE PREFERRED EMBODIMENTS

Hereinafter, an embodiment of a radio network controller and a broadcast information transmission method in accordance with the present invention will be described.

Figure 1:
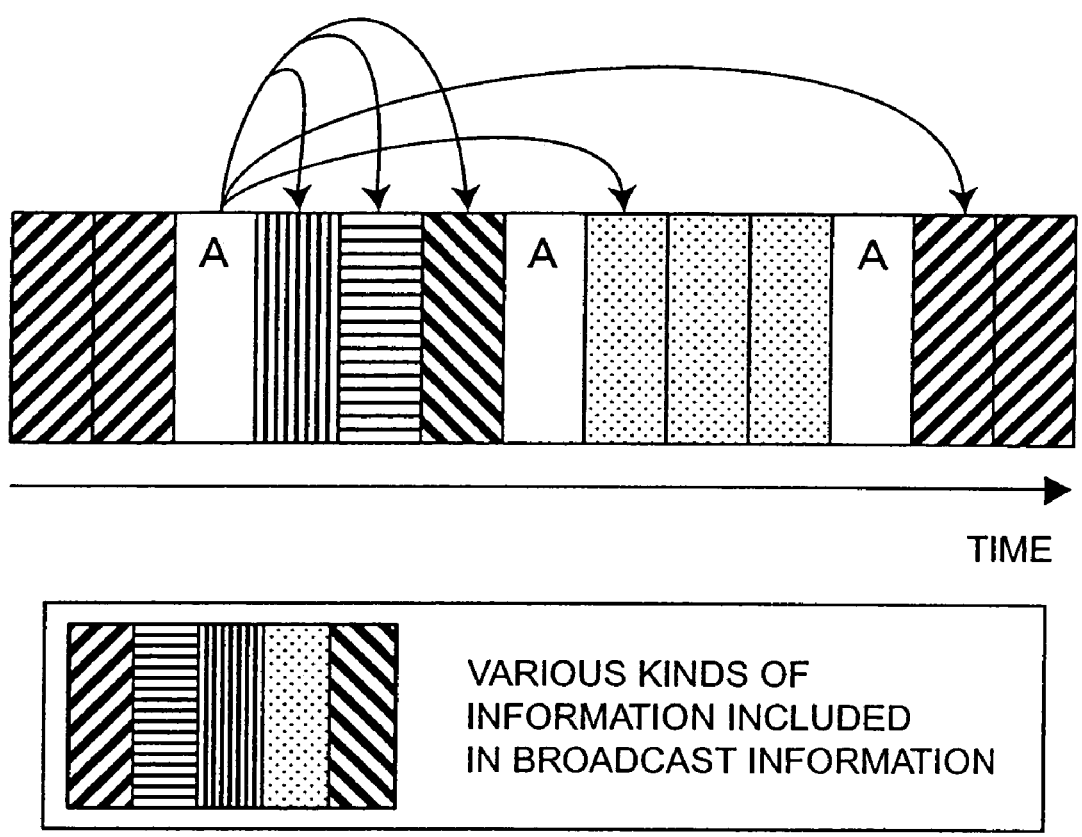
FIG. 1 is a view showing an example of broadcast information in accordance with a conventional method.
Figure 2:
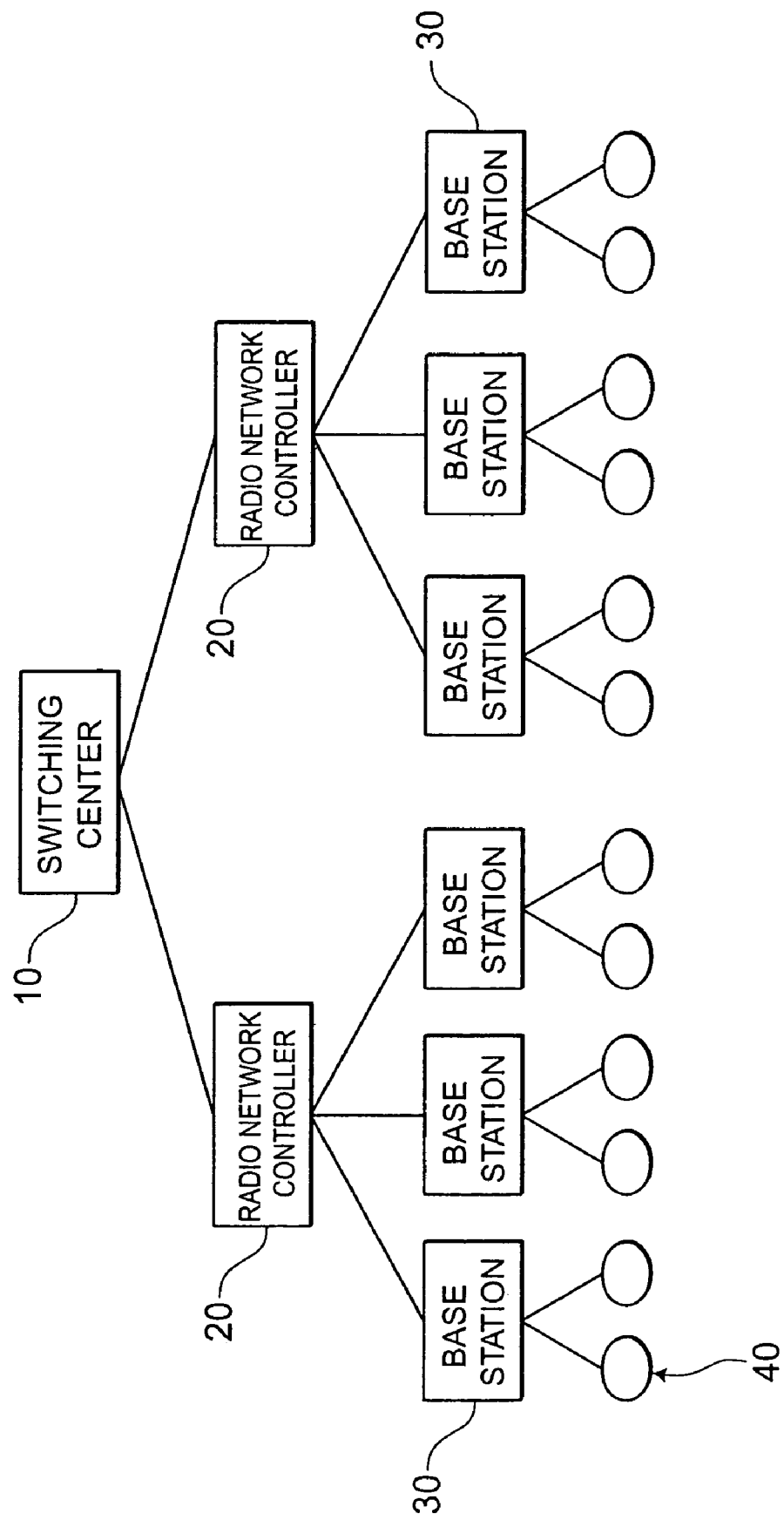
FIG. 2 is a view showing a configuration of DS-CDMA system in accordance with an embodiment of the invention.

FIG. 2 shows an example of a configuration of a DS-CDMA system. As shown in FIG. 2, the system comprises a switching center 10, a radio network controller 20 and a base station 30, which are structured in a hierarchical fashion. That is, the switching center 10 for connecting with other networks is connected to a plurality of radio network controllers 20, and each radio network controller 20 controls a plurality of base stations 30. Each base station 30 administers a plurality of cells 40 (or plurality of clusters).

In this embodiment, it is assumed that there are two mobile communication systems, which reside in the same frequency band in the same area and have common specification for physical layer in a state where all or a part of upper layer protocols have no compatibility. The switching center 10, the radio network controllers 20 and the base stations 30 in FIG. 2 support both of the two mobile communication systems. Also, the mobile stations residing in the area of each cell 40 (or each cluster) support either one system in the above two mobile communication systems, and periodically receive various kinds of broadcast information such as information, which is necessary for waiting, and information, which is effective after connection. Various kinds of broadcast information about each mobile communication system is prepared in the radio network controllers 20, and is broadcast to the mobile stations via the base stations 30. Hereinafter, the two mobile communication systems will be referred to as system 1 and system 2 respectively.

Figure 3:
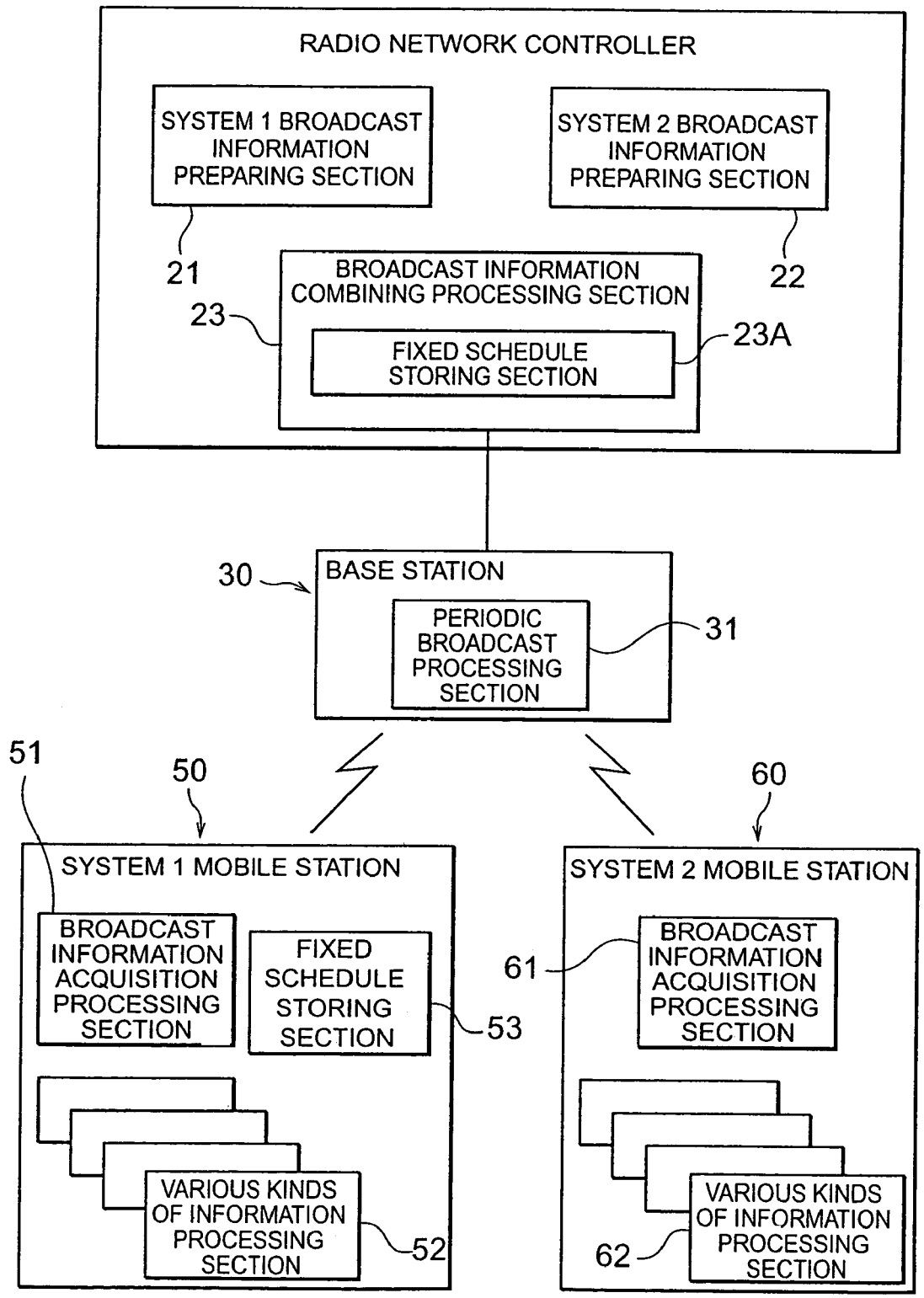
FIG. 3 is a view showing component elements relevant to the present invention.

FIG. 3 shows component elements relevant to the present invention. As shown in FIG. 3, the radio network controller 20 comprises a system 1 broadcast information preparing section 21 that prepares broadcast information for the system 1, a system 2 broadcast information preparing section 22 that prepares broadcast information for the system 2, and a broadcast information combining processing section 23 that combines broadcast information for the system 1 and broadcast information for the system 2. The base station 30 is equipped with a periodic broadcast processing section 31 that periodically and faithfully transmits broadcast information prepared by the radio network controller 20 in accordance with the instruction given by the radio network controller 20.

A mobile station 60 that supports the system 2 (hereinafter, referred to as "mobile station for system 2") is equipped with a broadcast information acquisition processing section 61 that acquires the broadcast information and a plurality of various kinds of information processing sections 62 that performs processing of various kinds of information broadcast by the broadcast information. On the other hand, a mobile station 50 that supports the system 1 (hereinafter, referred to as "mobile station for system 1") is equipped with, in addition to a broadcast information acquisition processing section 51 and a plurality of various kinds of information processing sections 52, which are the same as the above, a fixed schedule storing section 53 that fixedly stores the timing information by which various kinds of information about the system 1 is broadcast.

Also, a fixed schedule storing section 23A that stores broadcast timing information, which is the same as the broadcast timing information about the system 1 stored in the above-mentioned fixed schedule storing section 53, is provided in the broadcast information combining processing section 23 of the radio network controller 20.

The processing operation in the present embodiment will be described below.

Figure 4:
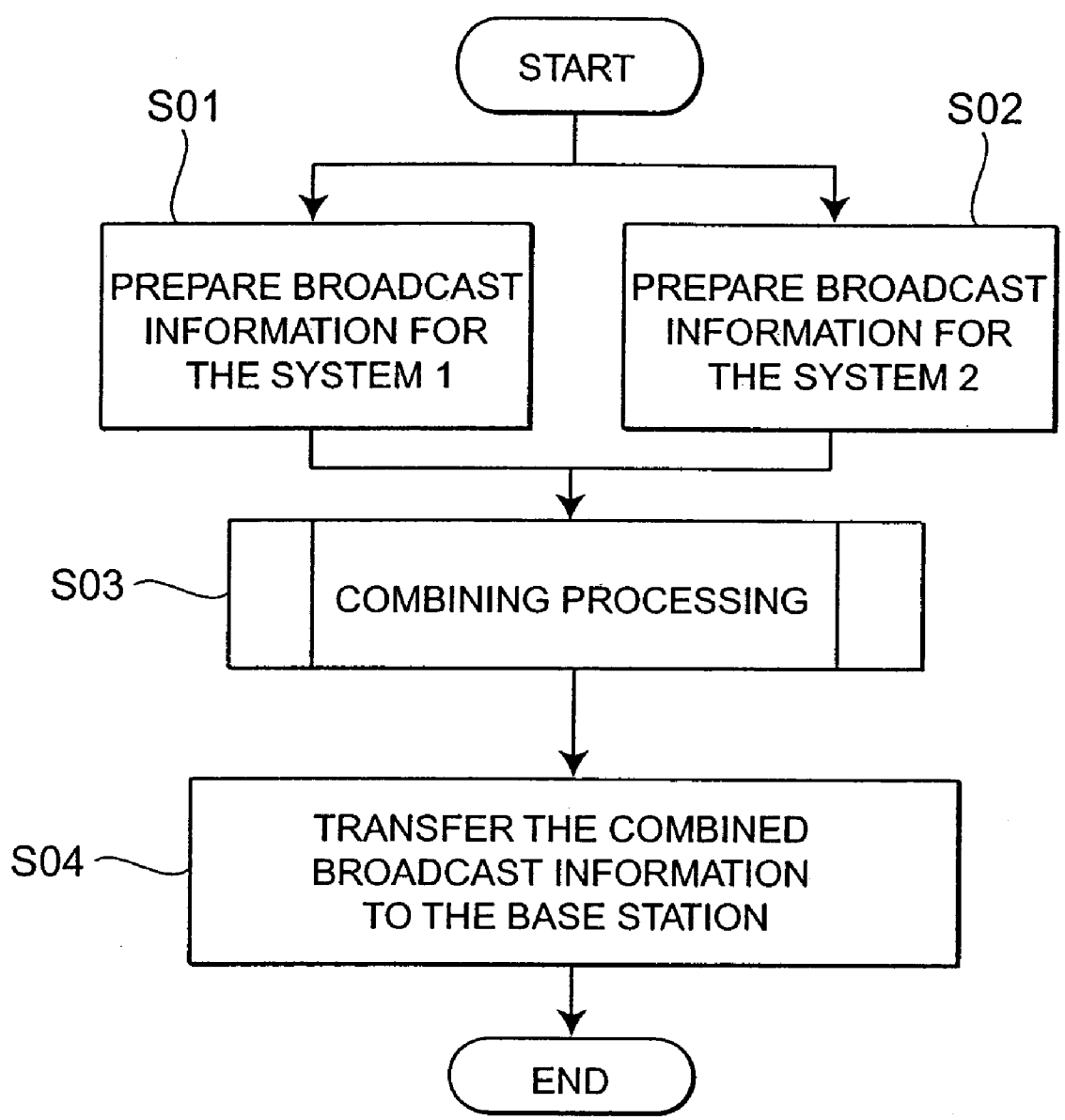
FIG. 4 is a flowchart showing broadcast information transmission processing in a radio network controller.
Figure 5:
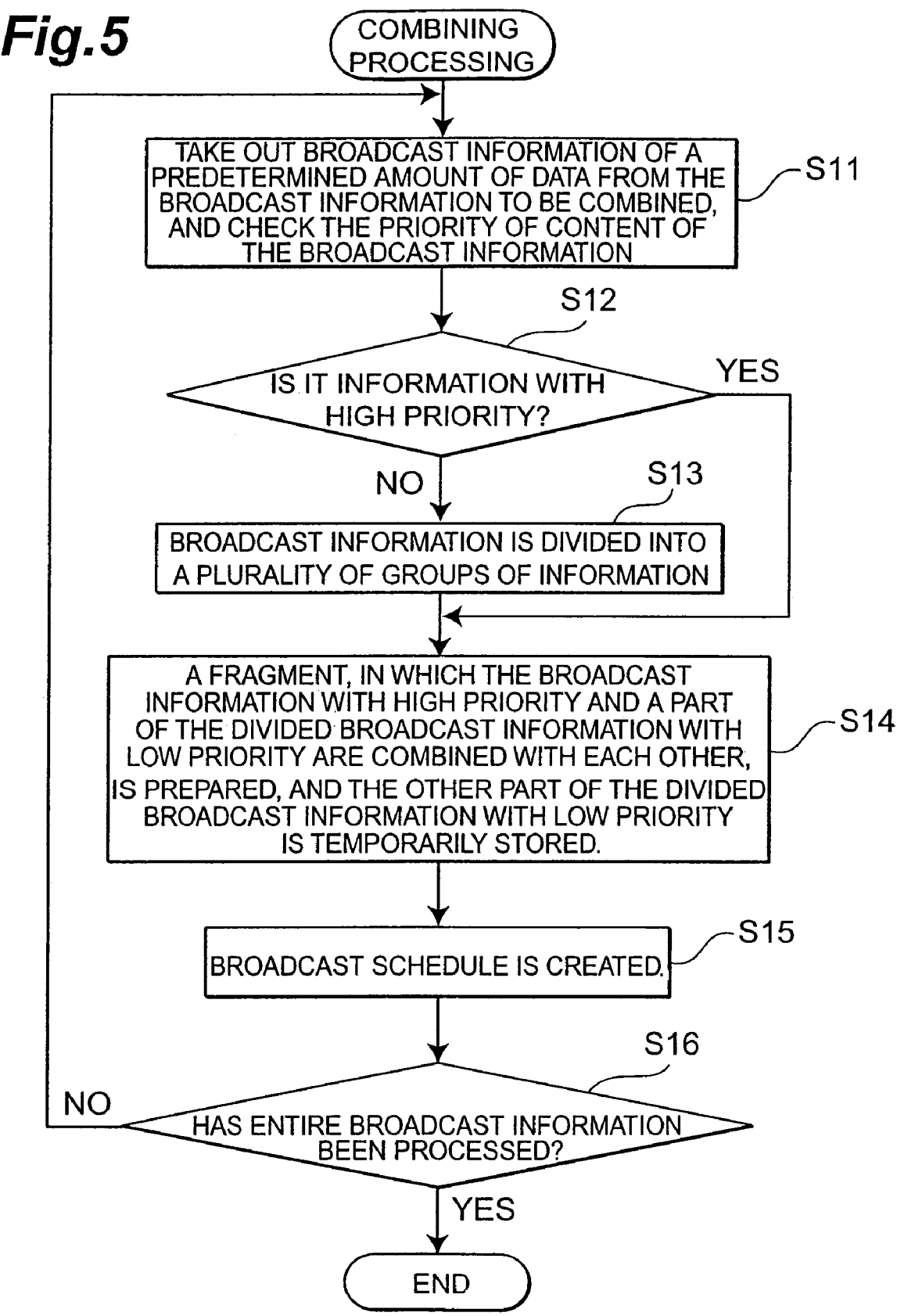
FIG. 5 is a flowchart showing combining processing in a broadcast information combining processing section in the radio network controller.

In the first place, there will be described the processing operation of the radio network controller 20 while using FIGS. 4, 5. The radio network controller 20 prepares broadcast information for the system 1 and broadcast information for the system 2 separately (S01 and S02 in FIG. 4). In the next S03, the broadcast information combining processing section 23 performs combining processing, which will be described later (FIG. 5), and then transfers the combined broadcast information to the base station 30 (S04).

Here, referring to FIG. 5, the combining processing will be described. First, in S11, the broadcast information combining processing section 23 takes out broadcast information of a predetermined amount of data from the broadcast information to be combined, and checks the priority of content of the broadcast information. For example, information necessary for connecting swiftly (information of common channel used at transmitting, information about access restriction, information of which content is to be frequently altered or the like) is determined as information with high priority; information such as peripheral area information and information about GPS function etc, which is unnecessary depending on the capability of the mobile station, is determined as information with low priority.

In S12, based on the result of the content check of the broadcast information, the broadcast information is determined whether the information has high priority or not. When the broadcast information is not information with high priority (when it is information with low priority), in S13, the broadcast information is divided into a plurality of (for example, two) groups of information. When the broadcast information is the information with high priority, the broadcast information is not divided.

In S14, a fragment, in which the broadcast information with high priority and a part of the divided broadcast information with low priority are combined with each other, is prepared, and the other part of the divided broadcast information with low priority is temporarily stored. In S15, the fragment prepared in S14 is broadcast alternately to each system, and based on system 1 broadcast timing information in the fixed schedule storing section 23A, a broadcast schedule is created so that broadcast timing of the system 1 broadcast information agrees with the system 1 broadcast timing. The following embodiment may be adopted; i.e., external data about the schedule of the system 2 broadcast information (for example, broadcast period of the system, 2 broadcast information and intervals of fragments in the above-mentioned fragment preparation, etc) is set by a user (an administrator), and the broadcast information combining processing section 23 creates broadcast schedule in accordance with the external data.

Figure 6:
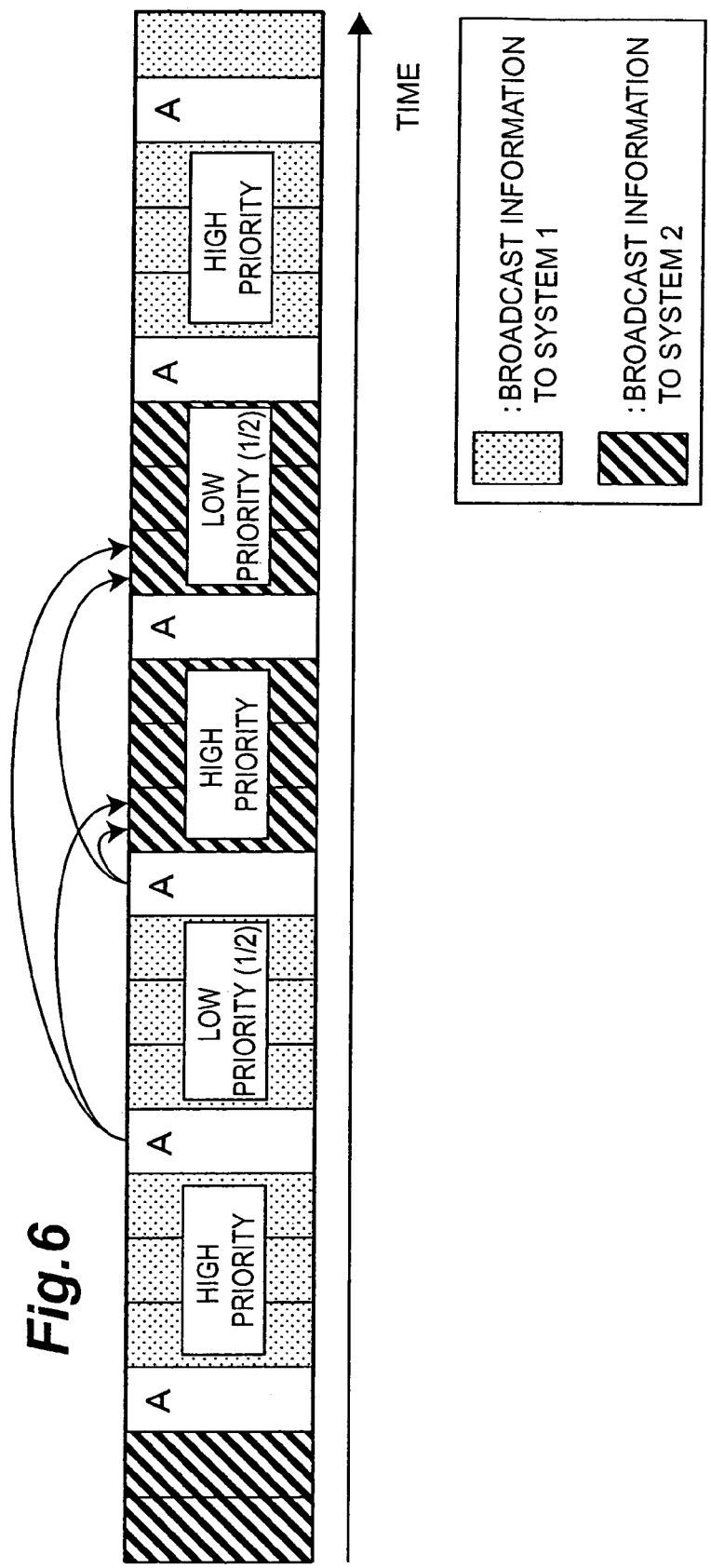
FIG. 6 is a view showing an example of broadcast information after the combining processing.

After that, in S16, the processing S11 to S15 is repeated on the remaining broadcast information to be broadcast until it is determined that the processing S11 to S15 has been completed on entire broadcast information. Owing to the combining processing as described above, as shown in FIG. 6, the broadcast information is broadcast alternately between the systems 1 and 2. And in each system, at a certain timing, a piece of information with high priority and a half of a piece of information with low priority are broadcast, and at the next timing in the relevant system, a piece of information with high priority and the rest of the information with low priority are broadcast. Owing to this, the swiftness of the transmission can be controlled in accordance with the priority of the broadcast information; thus, appropriate broadcast information transmission control in accordance with the priority of the broadcast information can be carried out. Also, the broadcast timing of the systems 1 and 2 can be scheduled to be staggered from each other. The broadcast information combining processing section 23, which performs the above-described processing, is equivalent to the control unit according to the present invention. The arrow in FIG. 6 indicates information (time pointer information) at what timing the broadcast information to the system 2 is broadcast.

Next, the operation of the base station 30 will be described. The base station 30 simply transmits the broadcast information created by the radio network controller 20 periodically in accordance with the instruction given by the radio network controller 20 through the periodic broadcast processing section 31.

Figure 7:
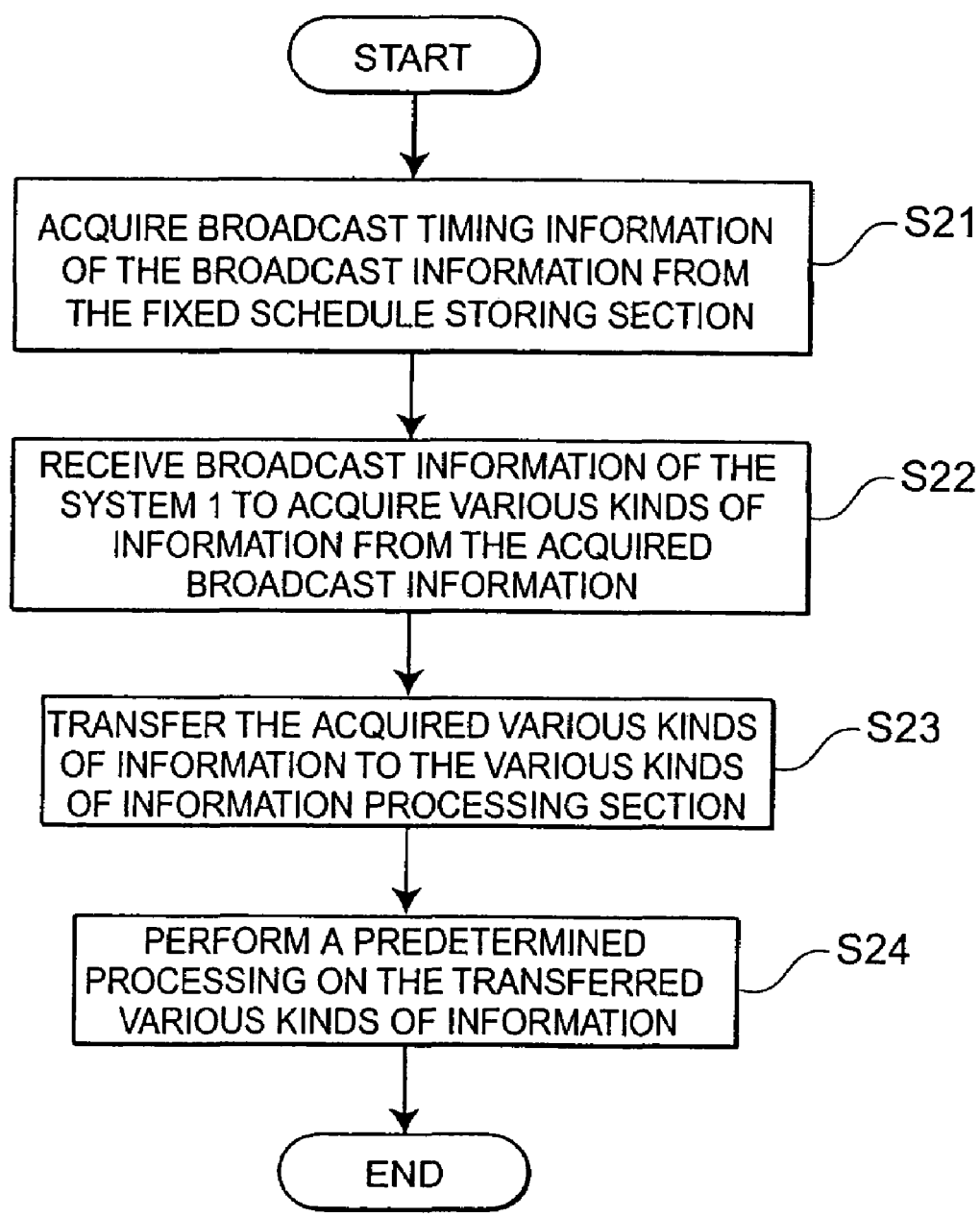
FIG. 7 is a flowchart showing broadcast information reception processing in a mobile station, which supports system 1.
Figure 8:
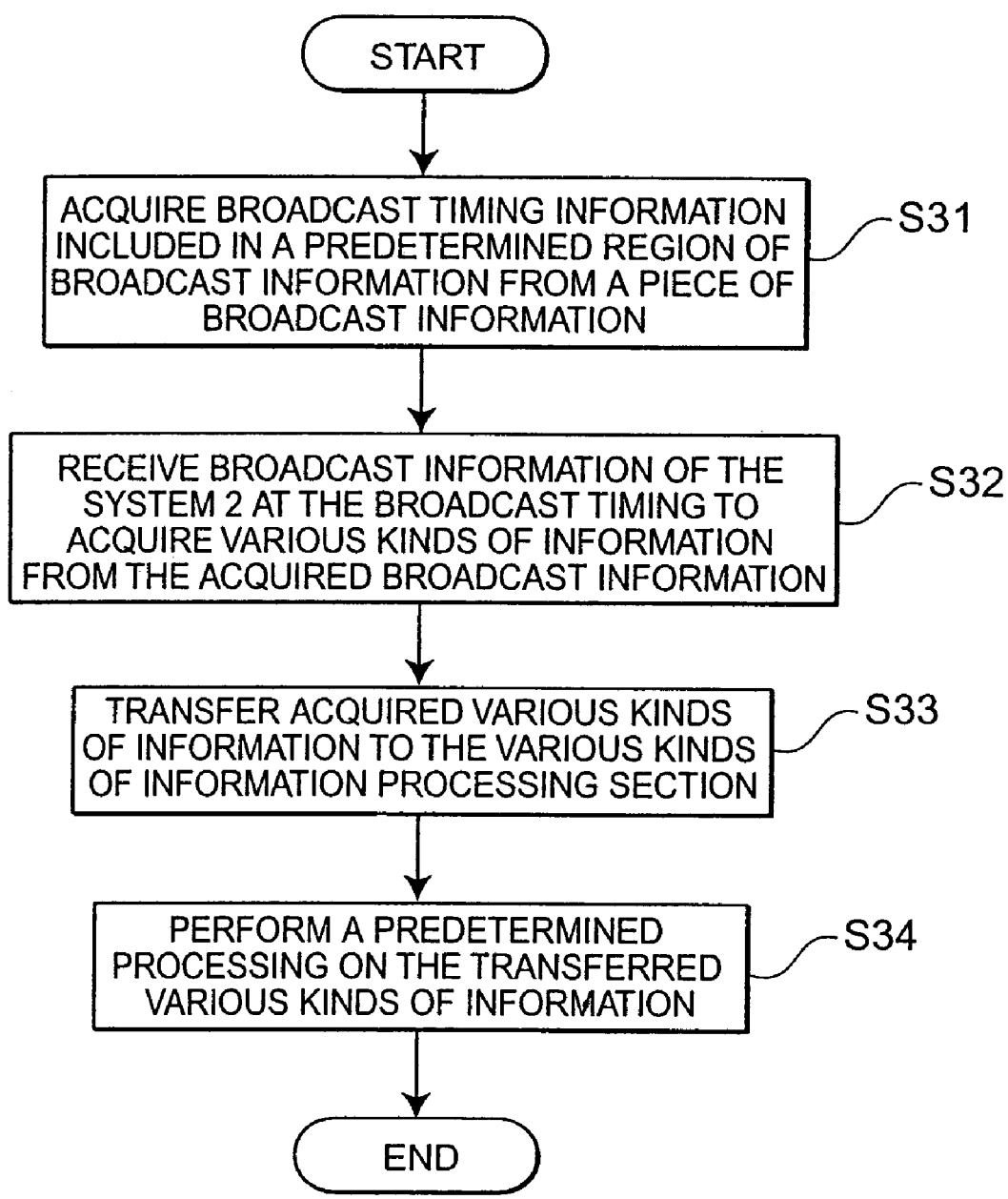
FIG. 8 is a flowchart showing broadcast information reception processing in a mobile station, which supports system 2.

Next, referring to FIG. 7 and FIG. 8, the operation of the mobile station will be described. As shown in FIG. 7, in the mobile station 50 for system 1, the broadcast information acquisition processing section 51 acquires broadcast timing information of the broadcast information from the fixed schedule storing section 53 (S21), receives broadcast information of the system 1 at the broadcast timing to acquire various kinds of information from the acquired broadcast information (S22), and transfers the acquired various kinds of information to the various kinds of information processing section 52 (S23). The various kinds of information processing section 52 perform a predetermined processing on the transferred various kinds of information (S24).

On the other hand, in the mobile station 60 for system 2, the broadcast information acquisition processing section 61 acquires broadcast timing information included in a predetermined region (for example, region A in FIG. 6) of broadcast information from a piece of broadcast information (S31), receives broadcast information of the system 2 at the broadcast timing to acquire various kinds of information from the acquired broadcast information (S32), and transfers acquired various kinds of information to the various kinds of information processing section 52 (S33). The various kinds of information processing section 62 performs a predetermined processing on the transferred various kinds of information (S34).

As described, the mobile station 50 for system 1, at a previously stored broadcast timing; while the mobile station 60 for system 2, at a broadcast timing, which is scheduled to be staggered from the broadcast timing of the system 1 set in a predetermined region (for example region A in FIG. 6) of the broadcast information, can receive broadcast information of the respective systems, and acquire various kinds of information from the broadcast information.

Owing to this, according to the above-described embodiment, it is possible to prevent mutual interference between two systems; and what is notified by a part of region of the broadcast information is the broadcast timing information of the system 2 only. Accordingly, even when the amount of the information of the broadcast information is large, it is made possible to prevent such problem as increase in connection delay, and to prevent the transmission efficiency of the information from decreasing in each system. Thus, it is possible to allow two systems residing in the same area and same frequency band to be coexistent compatibly with each other while reducing the mutual interference.

As described above, according to the present invention, broadcast information about one mobile communication system is broadcast at a predetermined timing. Thereby, the broadcast timing of the broadcast information about the other mobile communication system can be easily scheduled to be staggered from the broadcast timing of the above one mobile communication system. The broadcast information of the other mobile communication system is broadcast in accordance with the broadcast timing, which is scheduled to be staggered therefrom and notified. Accordingly, mutual interference between two mobile communication systems can be suppressed. Further, what is notified by a part of region of the broadcast information is the broadcast timing information only of the other mobile communication system. Accordingly, even when the amount of information of the broadcast information is large, it is possible to prevent such problem as increase in connection delay, and to prevent the transmission efficiency of the information from decreasing. Thus, it is possible to allow two systems residing in the same area and same frequency band to be coexistent compatibly with each other while reducing the mutual interference.

What is claimed is:

1. A radio network controller for transmitting broadcast information via a common channel to at least two mobile communication networks which comprise at least one prescheduled mobile communication network and at least one unscheduled mobile communication network, the radio network controller comprising:
    at least one information preparation section configured to prepare broadcast information for the at least two mobile communication networks;
    a memory which stores at least one predetermined schedule for the at least one prescheduled mobile communication network, wherein the predetermined schedule identifies time slots of the common channel assigned for transmissions of the broadcast information to the at least one prescheduled mobile communication networks;
    a scheduler configured to make at least one new schedule for the at least one unscheduled mobile communication network, wherein the scheduler, given the at least one predetermined schedule, determines available time slots of the common channel to assign transmissions of the broadcast information to the at least one unscheduled mobile communication network; and
    a transmission preparation section configured to form, according to the at least one predetermined schedule and the at least one new schedule, a stream of information from the broadcast information to be transmitted via the common channel to the at least two mobile communication networks, wherein the stream of information contains time pointer information at intervals in the stream which notifies a transmission schedule of the broadcast information to the at least one unscheduled mobile communication network.

2. A radio network controller according to claim 1, wherein the at least two mobile communication networks use a common frequency band for communication.

3. A radio network controller according to claim 1, wherein the at least one information preparation section prepares broadcast information of different kinds for the at least two mobile communication networks.

4. A radio network controller according to claim 1, wherein the scheduler classifies the broadcast information into the broadcast information of high priority and the broadcast information of low priority and gives priority in transmission to the broadcast information of high priority when scheduling transmissions of the broadcast information.

5. A radio network controller according claim 4, wherein the scheduler divides the broadcast information of low priority and schedules transmissions of divisions of the broadcast information of low priority over time after transmissions of the broadcast information of high priority.

6. A radio network controller according to claim 5, wherein the stream of information comprises a series of segments of information, and the transmission preparation section fills at least one segment with the broadcast information of high priority and at least one division of the broadcast information of low priority.

7. A radio network controller according to claim 4, wherein the broadcast information of high priority comprises any of information of the common channel, access restriction information and information on content which is to be frequently altered.

8. A radio network controller according to claim 4, wherein the broadcast information of low priority comprises any of peripheral area information and GPS information.

9. A radio network controller according to claim 1, wherein scheduler schedules transmissions of the broadcast information so that the broadcast information is transmitted substantially equally frequently to each of the at least two mobile communication networks.

10. A radio network control method for transmitting broadcast information via a common channel to at least two mobile communication networks which comprise at least one prescheduled mobile communication network and at least one unscheduled mobile communication network, the method comprising:
    providing at least one predetermined schedule for the at least one prescheduled mobile communication network, wherein the predetermined schedule identifies time slots of the common channel assigned for transmissions of the broadcast information to the at least one prescheduled mobile communication networks;
    preparing broadcast information for the at least two mobile communication networks;
    making at least one new schedule for the at least one unscheduled mobile communication network, wherein making at least one new schedule comprising determining, given the at least one predetermined schedule, vacant time slots of the common channel to assign transmissions of the broadcast information to the at least one unscheduled mobile communication network; and
    according to the at least one predetermined schedule and the at least one new schedule, forming a stream of information from the broadcast information to be transmitted via the common channel to the at least two mobile communication networks, wherein the stream of information contains time pointer information at intervals in the stream which notifies a transmission schedule of the broadcast information to the at least one unscheduled mobile communication network.

11. A method according to claim 10, wherein transmitting broadcast information comprises transmitting broadcast information to the at least two mobile communication networks, using a common frequency band.

12. A method according to claim 10, wherein preparing broadcast information comprises preparing broadcast information of different kinds for the at least two mobile communication networks.

13. A method according to claim 10, wherein making at least one new schedule comprises classifying the broadcast information into the broadcast information of high priority and the broadcast information of low priority and giving priority in transmission to the broadcast information of high priority.

14. A method according claim 13, wherein giving priority in transmission to the broadcast information of high priority comprises dividing the broadcast information of low priority and scheduling transmissions of divisions of the broadcast information of low priority over time after transmissions of the broadcast information of high priority.

15. A method according to claim 14, wherein forming a stream of information comprises defining a series of segments of information and filling at least one segment with the broadcast information of high priority and at least one division of the broadcast information of low priority.

16. A method according to claim 10, wherein the broadcast information of high priority comprises any of information of the common channel, access restriction information and information on content which is to be frequently altered.

17. A method according to claim 10, wherein the broadcast information of low priority comprises any of peripheral area information and GPS information.

18. A method according to claim 10, wherein making at least one new schedule comprises scheduling transmissions of the broadcast information so that the broadcast information is transmitted substantially equally frequently to each of the at least two mobile communication networks.

* * * * *